(12) United States Patent
Hollasch

(10) Patent No.: US 7,133,043 B1
(45) Date of Patent: Nov. 7, 2006

(54) COMPUTER GRAPHICS METHODS AND APPARATUS FOR RAY INTERSECTION

(75) Inventor: Steven R. Hollasch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 09/451,256

(22) Filed: Nov. 29, 1999

(51) Int. Cl.
*G06T 15/40* (2006.01)
(52) U.S. Cl. ...................... 345/421; 382/241
(58) Field of Classification Search .......... 345/419–21, 345/427, 426, 421; 382/241
See application file for complete search history.

(56) References Cited

U.S. PATENT DOCUMENTS

| | | | |
|---|---|---|---|
| 4,687,326 A * | 8/1987 | Corby, Jr. | 356/5.01 |
| 4,727,471 A * | 2/1988 | Driels et al. | 700/66 |
| 4,899,318 A * | 2/1990 | Schlumberger et al. | 367/8 |
| 5,227,985 A * | 7/1993 | DeMenthon | 702/153 |
| 5,276,613 A * | 1/1994 | Schlumberger | 378/4 |
| 5,442,733 A * | 8/1995 | Kaufman et al. | 345/424 |
| 5,877,768 A | 3/1999 | Jain | 345/421 |
| 6,023,279 A * | 2/2000 | Sowizral et al. | 345/421 |
| 6,057,847 A * | 5/2000 | Jenkins | 345/422 |
| 6,057,852 A * | 5/2000 | Krech, Jr. | 345/589 |
| 6,111,582 A * | 8/2000 | Jenkins | 345/421 |
| 6,208,347 B1 * | 3/2001 | Migdal et al. | 345/419 |
| 6,215,503 B1 * | 4/2001 | Snyder et al. | 345/629 |
| 6,226,005 B1 * | 5/2001 | Laferriere | 345/419 |
| 6,249,287 B1 * | 6/2001 | Yamrom | 345/419 |
| 6,266,064 B1 * | 7/2001 | Snyder | 345/421 |
| 6,307,555 B1 * | 10/2001 | Lee | 345/423 |
| 6,587,104 B1 * | 7/2003 | Hoppe | 345/423 |
| 2002/0050990 A1 * | 5/2002 | Sowizral et al. | 345/421 |

FOREIGN PATENT DOCUMENTS

EP 0 511 537 A2 11/1992

OTHER PUBLICATIONS

Schroeder et al., "Decimation of Triangle Meshes," Computer graphics, 26:2:65-7- (Jul. 1992).*
Funkhouser et al., "Adaptive Display Algorithm for Interactive Frame Rates During Visualization of Complex Virtual Environments," Computer graphics proceedings, Annual Conference Series, 247-254 (1993).*
Surface simplification using quadric error metrics Michael Garland, Paul S. Heckbert; Aug. 1997.*

(Continued)

*Primary Examiner*—Kee M. Tung
*Assistant Examiner*—J. Amini
(74) *Attorney, Agent, or Firm*—Lee & Hayes, PLLC

(57) ABSTRACT

Ray-intersection methods and apparatus that greatly facilitate processing associated with computer graphics are described. In the described embodiment, a collection of shapes are defined that approximate an object. The described shapes are polygons, with exemplary polygons comprising triangles. A ray is cast toward the approximated object, and a reference object which, in the described embodiment comprises one or more planes, is defined to contain the ray. Aspects of the individual shapes are pre-characterized to provide characteristic data. In the described embodiment, pre-characterization takes place by testing each of the vertices of the polygons to ascertain their position relative to the reference object. The characteristic data is then used to ascertain the position of the shapes that are defined by the vertices, relative to the reference object. This provides a sub-set of shapes that might be intersected by the ray. The sub-set of shapes is then evaluated to ascertain which of the shapes is intersected by the ray.

56 Claims, 7 Drawing Sheets

OTHER PUBLICATIONS

Fast and memory efficient polygonal simplification Peter Lindstrom, Greg Turk; Oct. 1998.*

Progressive meshes Hugues Hoppe; Aug. 1996.*

Simplification envelopes Jonathan Cohen, Amitabh Varshney, Dinesh Manocha, Greg Turk, Hans Weber, Pankaj Agarwal, Frederick Brooks, William Wright ; Aug. 1996.*

Controlled simplification of genus for polygonal models Jihad El-Sana, Amitabh Varshney ; Oct. 1997.*

Decimation of triangle meshes William J. Schroeder, Jonathan A. Zarge, William E. Lorensen ; Jul. 1992.*

H. K. Choi et al, "Pysha: a shadow-testing acceleration scheme for ray tracing", Feb. 1992, pp. 93-104.

* cited by examiner

COMPUTER GRAPHICS METHODS AND APPARATUS FOR RAY INTERSECTION

TECHNICAL FIELD

This invention relates to computer graphics techniques and, more particularly, to apparatus and methods that optimize processing techniques to determine which of a number of shapes that approximate an object, and in particular approximate the surface of an object, have been intersected by a cast ray.

BACKGROUND

Computer graphics techniques typically involve manipulating computer-generated objects. Many techniques have evolved to assist in object manipulation, one of which typically represents or approximates an object and, in particular, approximates the surface of an object as collections of other smaller objects like polygons, e.g. triangles. That is, objects, some of which might have fairly complex surface characteristics, can be represented as collections of triangles that collectively represent or approximate the surface characteristics of the object. When object manipulation takes place, the manipulation operations are performed relative to the smaller shapes that approximate the surface of the object.

One technique that is used to manipulate objects is ray intersection. Ray intersection techniques can be used in a number of different scenarios that include image rendering, object selection, and surface interrogation (i.e. surface querying).

In image rendering, a ray can be directed from a visual point toward a picture element on a screen. Each object that is hit, or intersected, by the ray is set as an object to be drawn on the picture element to which the color of the object is allocated. This method of color processing the object can render effects of optical attributes, such as the reflection or the refraction of the object on the color of the object drawn on the screen by using the colors of the reflected ray from another object or the refracted ray through another object. Therefore, this method can precisely express reflexes by the reflection or the refraction of other objects surrounding the intersected object.

Object selection involves operations where a user wants to directly manipulate a rendered image. For example, there may be a rendering of a scene that has particular objects in it. A user can click an object or a particular point on an object with a mouse, grab it, move it, and manipulate it. In this instance, the mouse click essentially casts a ray into the scene and determines the first object portion to be struck or intersected by the ray. Subsequent processing can take place based upon which objects are intersected by the ray.

Surface interrogation can involve an object moving through a rendered scene. In such applications, ray-intersection may be used to enable a determination as to which objects the moving object is about to collide with.

A majority of the processing that takes place in connection with ray-intersection concerns searching for an object that is intersected by a cast ray. Where, as here, the surface of objects are approximated by a plurality of shapes, e.g. triangles, conventional searching takes place by determining whether or not each and every shape that constitutes the approximated surface of an object is intercepted by the cast ray. For example, if the surface of an object is approximated by 6500 triangles, conventional searching algorithms test a first triangle to determine whether the cast ray intercepts it. If the first triangle is not intercepted by the cast ray, then the next triangle is tested and so on. Needless to say, processing each of the shapes used to approximate the surface of an object, while effective, is not the most optimal approach to the problem. Additional background information can be found in the following U.S. Pat. Nos.: 5,594,844, 5,933,146, 5,313,568, 5,091,960, and 5,138,699.

Accordingly, this invention arose out of concerns associated with improving the apparatus and methods that are used in connection with computer graphics. In particular, the invention arose out of concerns associated with improving object-intersection processing techniques.

SUMMARY

Ray-intersection methods and apparatus that greatly facilitate computer graphics processing are described. In the described embodiment, a collection of shapes is first defined that approximates an object. The described shapes are polygons, with exemplary polygons comprising triangles. Various topologies can be used including triangle meshes, triangle strips, and triangle fans. A ray is cast toward the approximated object. A reference object which, in the illustrated example comprises a plane, is defined to contain the ray. Advantageously, the plane is selected to be parallel to one of the x, y, and z axes which assists in reducing computational complexity.

With the plane and ray having been defined, aspects of the individual shapes are pre-characterized to provide characteristic data. In the illustrated example, pre-characterization takes place by testing each of the vertices of the polygons that make up the approximated object to ascertain their position relative to the reference object. With all of the vertices having been pre-characterized, the characteristic data is used to ascertain the position of the shapes relative to the reference object. This defines a sub-set of shapes that might be intersected by the ray. The sub-set of shapes is then evaluated to ascertain which of the shapes is intersected by the ray. In other embodiments, the reference object can comprise more than one plane, e.g. two or more planes. Thus, each of the individual shapes that comprise a particular approximated object need not be individually tested for an intersection with the ray. Rather, only a sub-set of shapes that might be intersected by the ray are tested, with the other shapes having been ruled out based upon analysis of the characteristic data.

DETAILED DESCRIPTION

Exemplary Computer System

Figure 1:
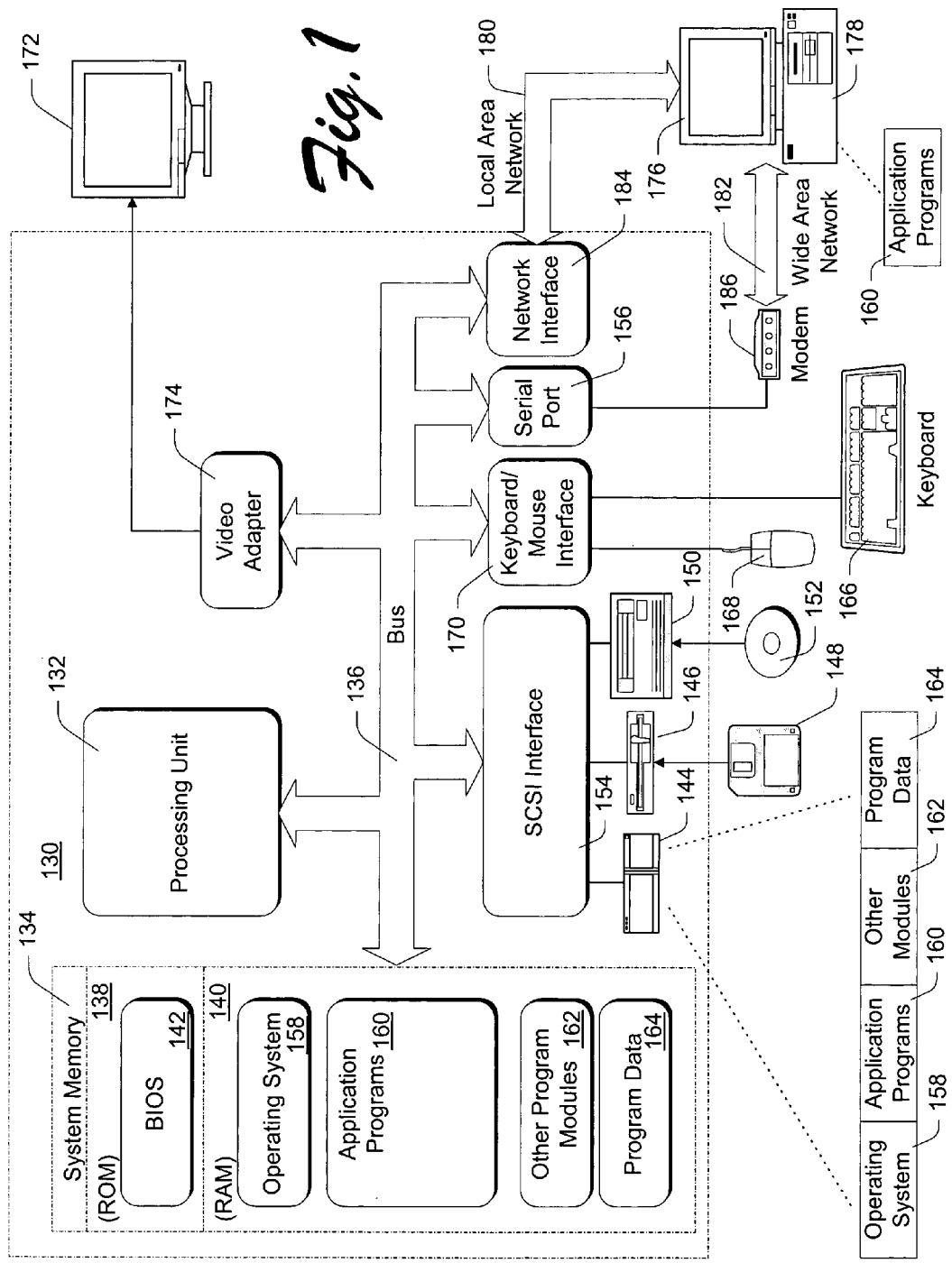
FIG. 1 is an exemplary computer system that can be used to implement the described embodiment of the present invention.

FIG. 1 shows a general example of a computer 130 used to implement a computer graphic system in accordance with the described embodiment of the present invention.

Computer 130 includes one or more processors or processing units 132, a system memory 134, and a bus 136 that couples various system components including the system memory 134 to processors 132. Bus 136 represents one or more of any of several types of bus structures, including a memory bus or memory controller, a peripheral bus, an accelerated graphics port, and a processor or local bus using any of a variety of bus architectures. System memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown); a magnetic disk drive 146 for reading from and writing to a removable magnetic disk 148; and an optical disk drive 150 for reading from or writing to a removable optical disk 152 such as a CD ROM or other optical media. Hard disk drive 144, magnetic disk drive 146, and optical disk drive 150 are connected to bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include, but not limited to, a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. Remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over wide area network 182, such as the Internet. Modem 186, which may be internal or external, is connected to bus 136 via a serial port interface 156. In a networked environment, program modules depicted relative to personal computer 130, or portions thereof, may be stored in the remote memory storage device. It will be appreciated by one of ordinary skill in the art that the network connections shown herein are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contains instructions or programs for implementing the steps described below in conjunction with a microprocessor or other data processor. The present invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Overview

Conventional algorithms that evaluate objects by approximating the object with shapes, e.g. approximating the surface of an object as formed by a plurality of shapes, typically test each individual shape to determine whether a cast ray intersects with a given shape. Exemplary conventional intersection algorithms are described in the following publications: (1) *An Introduction to Ray Tracing*, Andrew Glassner, ISBN 0-12-286160-4, section 3.2, *Polygon Intersection*; (2) *Real-Time Rendering*, Tomas Moller and Eric Haines, ISBN 1-56881-101-2, section 10.5, *Ray/Triangle Intersection*; (3) *Graphics Gems I*, edited by Andrew Glassner, ISBN 0-12-286165-5, pp 390–393, *An Efficient Ray-Polygon Intersec-*

*tion*, and p 394, *Fast Ray-Polygon Intersection*; and (4) *Graphics Gems II*, edited by James Arvo, ISBN 0-12-064480-0, pp 257–263, *Ray-Triangle Intersection Using Binary Recursive Subdivision*.

In the described embodiment, the total number of shapes that are typically evaluated by the conventional algorithms for an intersection are significantly reduced prior to evaluation. This reduction of the number of shapes to be evaluated is achieved by pre-characterizing aspects of the individual shapes that make up an object. Through the illustrated and described pre-characterization processing, a sub-set of possible intersected shapes, which has a smaller number of shapes than the total number of shapes that approximate the surface of the object, is defined, with such sub-set being subsequently evaluated to ascertain those shapes within the sub-set that are intersected by the defined ray. Reducing the number of shapes that are evaluated for ray intersections greatly reduces the processing overhead thereby improving processing times. Improvements over conventional processing techniques have been observed on the order of 5- to 10-times faster.

Exemplary Method

Figure 2:
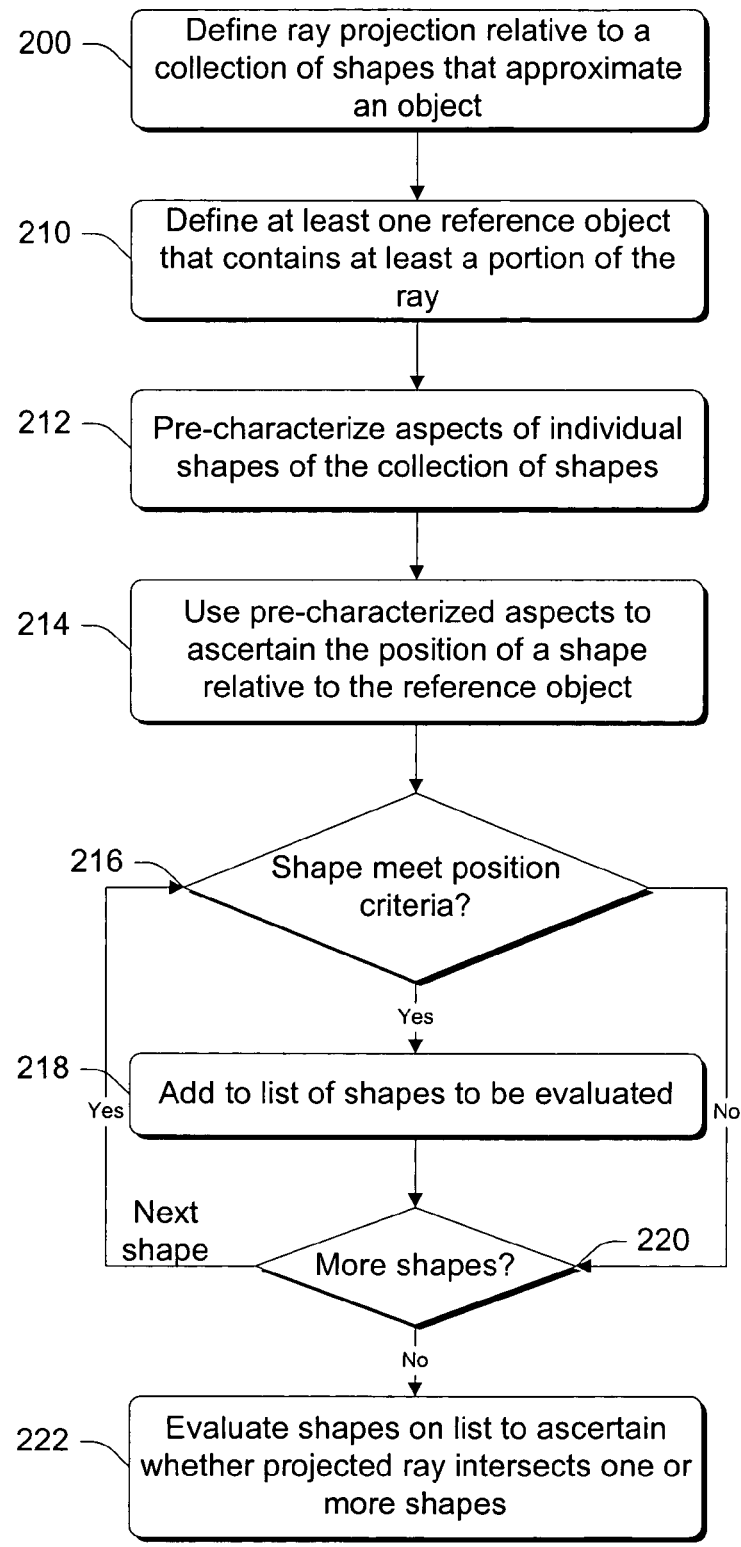
FIG. 2 is a flow diagram that describes steps in a method in accordance with the described embodiment.
Figure 3:
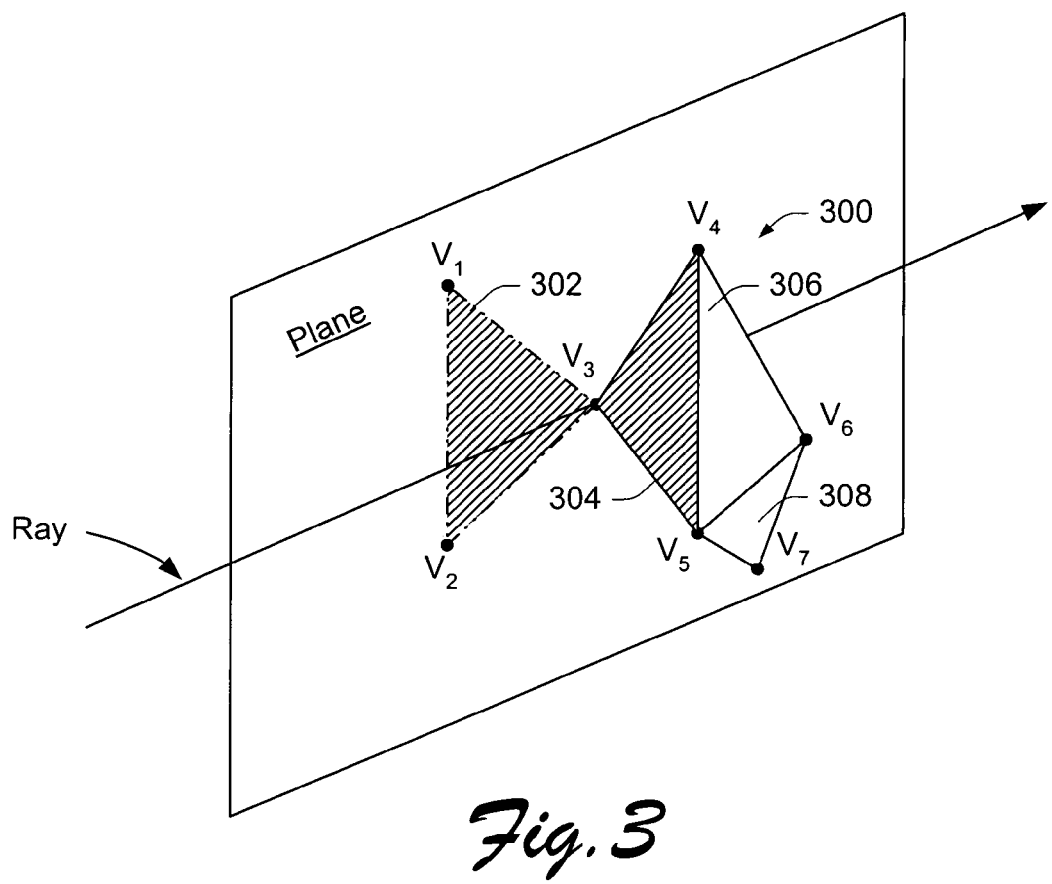
FIG. 3 is a diagrammatic representation of a ray, a reference object (and a shape collection in accordance with the described embodiment of the present invention.

FIG. 2 shows a flow diagram that describes processing steps in a ray-intersection method in accordance with the described embodiment. The steps depicted in FIG. 2 can be implemented in any suitable software, hardware, or firmware. FIG. 3, which will be used in connection with the description of FIG. 2, diagrammatically depicts aspects of the processing described by FIG. 2.

As shown, a collection of shapes is first defined to approximate an object in connection with a computer graphics program. In this example, the surface of the object is approximated by a collection of shapes. FIG. 3 shows an exemplary portion of such a collection generally at 300. Any suitable shapes can be used. In the described embodiment, the shapes have a similar geometry. Typically, polygons having a plurality of vertices are used. As will become apparent below, it is advantageous to select polygons that collectively have more faces than vertices when approximating the surface of an object. In the illustrated example, the polygons comprise triangles.

Figure 4:
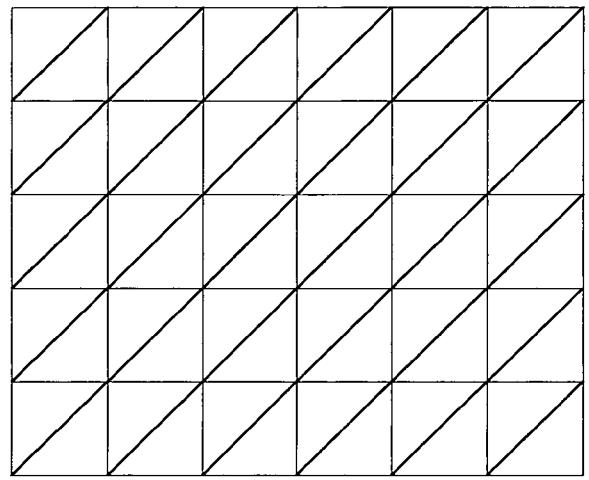
FIG. 4 is a diagram that illustrates an exemplary polygon topology known as a triangle mesh.
Figure 5:
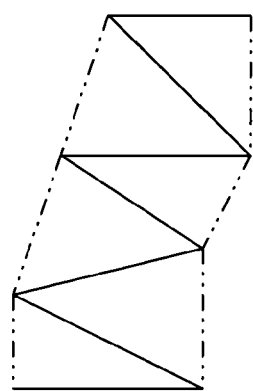
FIG. 5 is a diagram that illustrates an exemplary polygon topology known as a triangle strip.
Figure 6:
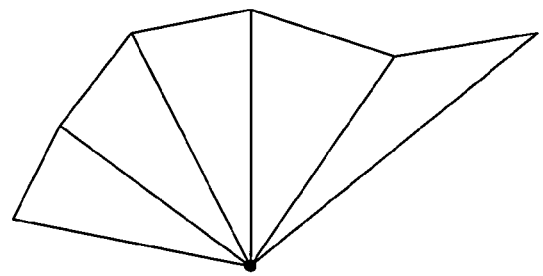
FIG. 6 is a diagram that illustrates an exemplary polygon topology known as a triangle fan.

As shown in FIG. 3, there are four depicted triangles, 302, 304, 306, and 308 having the vertices $V_1$–$V_7$ as indicated. There can be many thousands of triangles used to approximate the surface of an object. Additionally, the collection of triangles can be arranged to have different topologies. Exemplary topologies are shown in FIGS. 4–6. Specifically, FIG. 4 shows a topology known as a triangle mesh; FIG. 5 shows a topology known as a triangle strip; and FIG. 6 shows a topology known as a triangle fan. The collection of triangles can be arranged so that some of them share a side and/or vertices. For example, in FIG. 3, triangles 302 and 304 share a vertex, while triangles 304 and 306 share a side and two vertices. Other collections can be defined where none of the triangles share a vertex. Although triangles are depicted in the illustrated and described embodiment, it is to be understood that other shapes or polygons can be used to approximate an object.

Step 200 (FIG. 2) defines a ray (FIG. 3) that is cast toward the approximated object. The ray can be cast in any suitable manner using conventional ray-intersection techniques. Here, a ray (FIG. 3) is seen to extend toward and through collection 300. Step 210 defines at least one reference object relative to the approximated object. The reference object is defined in such a way that it contains at least a portion of the ray. In the illustrated and described embodiment, the reference object comprises a plane (FIG. 3), and the plane contains the entirety of the ray. In the described embodiment, a plane that is parallel to one of the x, y, and z axes is selected to reduce the processing complexity as will be described just below.

Specifically, a plane can be represented by the following equation:

$$Ax+By+Cz+D=0$$

Here, x, y, and z represent some point for which there is a real value. The real value for the point increases positively as the point is moved in a positive direction away from the plane. Similarly, the real value for the point increases negatively as the point is moved in a negative direction away from the plane.

In the described embodiment, by selecting the plane such that it is parallel to one of the above-mentioned axes (here, the z axis), z=0 and the equation is simplified as follows:

$$Ax+By+D=0$$

This optimization results in one less addition and one less multiply operation, which reduces the processing complexity.

Step 212 pre-characterizes aspects of the individual shapes that comprise the collection of shapes to provide characteristic data. In the illustrated and described embodiment, pre-characterization identifies positional aspects of sub-components components of the individual shapes. The sub-components in this example comprise the vertices of the triangles. Specifically, the position of each vertex is computed relative to the plane by simply evaluating the equation immediately above. The following table sets forth the outcome of the evaluation for each vertex:

| Equation Result | Position Relative To Plane |
| --- | --- |
| Ax + By + D = 0 | On the plane. |
| Ax + By + D < 0 | Negative side of the plane. |
| Ax + By + D > 0 | Positive side of the plane. |

Here, depending on the coordinates of the particular vertex, the evaluation of the equation will ascertain where the vertex is positioned relative to the plane. That is, if the equation evaluates to zero, then the vertex is on the plane. Alternatively, if the equation evaluates to less than or greater than zero, the vertex is on the negative side or positive side of the plane, respectively. In the FIG. 3 example, evaluation of the illustrated vertices will give the following results set forth in the table below:

| Equation Result | Position Relative To Plane |
| --- | --- |
| $V_1 < 0$ | Negative side of plane. |
| $V_2 < 0$ | Negative side of plane. |
| $V_3 = 0$ | On the plane. |
| $V_4 > 0$ | Positive side of plane. |
| $V_5 > 0$ | Positive side of plane. |
| $V_6 > 0$ | Positive side of plane. |
| $V_7 > 0$ | Positive side of plane. |

This evaluation is set forth in pseudo code as follows:

Boolean vflags [nVertices]
For i in [0, nVertices)
If (A * vertices $[i]_x$ + B * vertices $[i]_y$ + D) >0
   Vflag[i] ←true
Else
   Vflag[i] ←false Essentially, this routine loops through each vertex flagging it as "true" if it is on the positive side of the plane, or flagging it as false if it is on the negative side of the plane. For purposes of the analysis and evaluation of the shapes discussed below, a point that is on the plane can be considered as being either on the positive or the negative side of the plane, as long as consistency is maintained throughout the evaluation.

With the pre-characterization processing having been done as described above, step 214 uses the characteristic data to ascertain the position of a shape relative to the reference object. This step determines whether or not a particular individual shape has a chance of being intersected by the ray. In this manner, a sub-set of shapes that might be intersected by the ray is defined by determining which of the shapes satisfies a predefined relationship relative to the reference object, i.e. plane. Using the above example, the following is ascertained. If a shape's vertices are all on one side or the other of the reference object, here the FIG. 3 plane, then it is impossible for the ray (which lies in the plane) to intersect the shape. Accordingly, these shapes can be immediately discarded. If, on the other hand, a shape's vertices lie on both sides of the plane, then the object is said to "straddle" the plane. If this is the case, then the shape might be, but is not necessarily, intersected by the ray (e.g. the shape might straddle the plane, but be located entirely above or below the ray). This evaluation is set forth as steps 214 through 220. There, step 214 uses the characteristic data to ascertain the position of a shape relative to the reference object. This step determines whether a shape is on the negative side of, positive side of, or straddles the plane. Step 216 determines whether a particular shape meets position criteria. In this example, the position criteria assists in defining a sub-set of shapes that straddle the plane. If position criteria is met, then step 218 adds the shape to a list of shapes that are to be evaluated for intersection. If the position criteria is not met, or if the shape was added to the list of shapes for evaluation, step 220 then determines whether there are any additional shapes to evaluate. If there are, then the method loops back to step 216 and evaluates the next shape. If there are no additional shapes to evaluate, then step 222 evaluates the shapes that are on the list to ascertain whether the cast ray intersects one or more of the shapes. The intersection processing of step 222 can take place through the use of conventionally known techniques.

As an example, consider FIG. 3 again and assume that the adopted convention will consider vertices that lie on the plane to be on the positive side of the plane. Evaluation of all of the vertices indicates that only triangle 302 "straddles" the plane. In this case, the position criteria (i.e. does the shape straddle the plane?) is met. Hence, triangle 302 is added to the list of shapes that is to be evaluated (step 218) and step 220 determines whether there are any additional shapes to evaluate. Processing then takes place as described above.

Exemplary pseudo code that sets forth one way of accomplishing this task is set forth as follows:

For i in [0, nTriangles)
If (Vflag[tri[i][0] = Vflag[tri[i][1]])
And
(Vflag[tri[i][1] = Vflag[tri[i][2]])
Skip to next i
If StandardIntersect (tri[i][0], tri[i][1], tri[i][2])
Return TRUE What this code does is loop through each of the flags for the vertices of a shape to determine whether the vertices are all equal. For example, if all of the flags for a vertex are true or false, then the shape can be discarded and the code skips to the next i or shape. If, on the other hand, some of the flags are true and other of the flags are false, then the code executes a "StandardIntersect" algorithm, which determines whether or not there is an intersection. If there is an intersection between the ray and the shape, then the code returns a value indicating that this is the case. In this case, advantageously, the inventive processing rules out many of the shapes prior to using an intersect algorithm to ascertain whether or not there is an intersection between the ray and one or more shapes.

EXAMPLE

Figure 7:
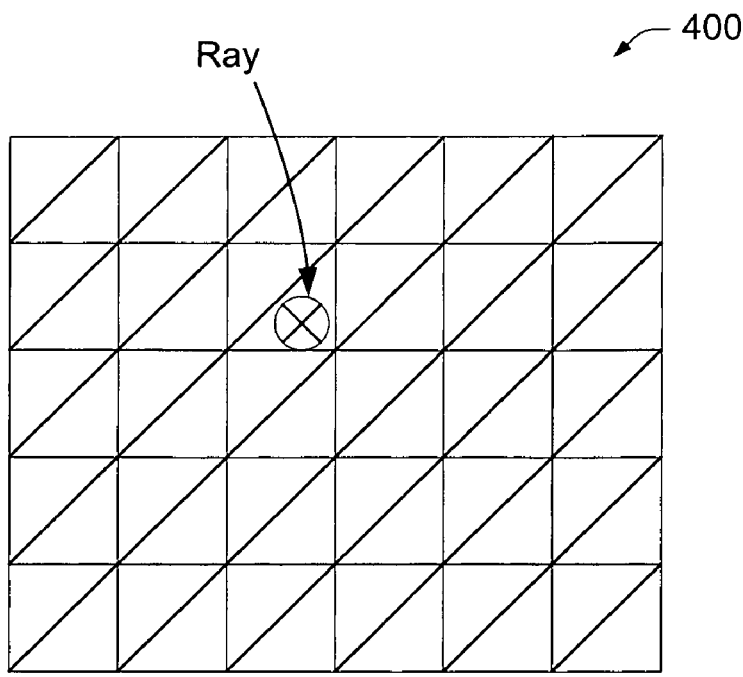
FIG. 7 is a diagram that illustrates the polygon topology of FIG. 4 undergoing processing in accordance with the described embodiment of the present invention.

As a further example, consider FIGS. 7–10. FIG. 7 shows a collection of shapes 400 that comprise a triangle mesh approximating an object of interest. Although this example is described in the context of a triangle mesh, it will be apparent to those of skill in the art, that the evaluation described just below can be conducted in connection with other topologies, examples of which are given above. In this particular example, the collection constitutes 60 surfaces (each triangle comprising one surface) and 42 vertices. In the past, intersection algorithms have evaluated each of the separate triangles of the illustrated collection to determine whether there is an intersection with a cast ray. So, in this case, conventional methods might have started with the first triangle in the first column, evaluated it for an intersection, and then discarded it when there was no intersection. This method would then step through each of the triangles, similarly evaluating them for an intersection with the ray. With complex surfaces having a high degree of resolution (i.e. many shapes), processing overhead can be quite large. Advantageously, the described embodiment reduces the number of shapes that must be tested for an intersection. This saves greatly on processing overhead and increases the speed with which objects are processed.

Figure 8:
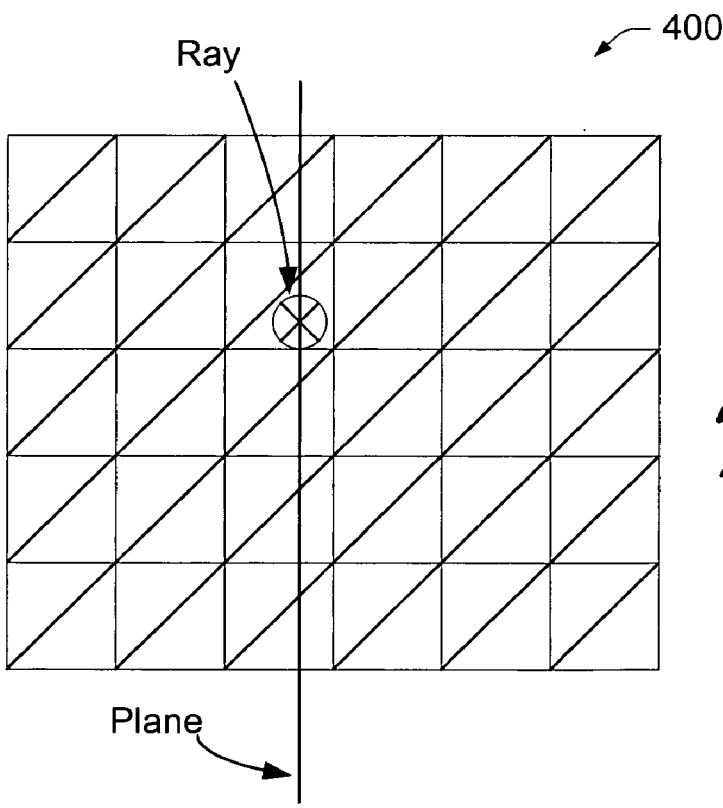
FIG. 8 is a diagram that illustrates the polygon topology of FIG. 7 undergoing processing in accordance with the described embodiment.
Figure 9:
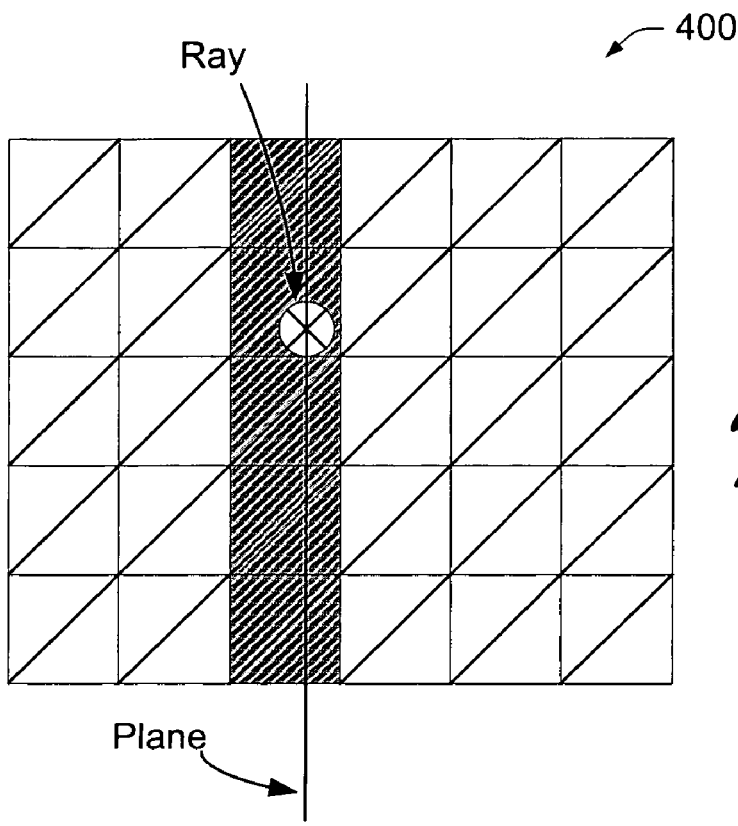
FIG. 9 is a diagram that illustrates the polygon topology of FIG. 8 undergoing processing in accordance with the described embodiment.

FIG. 7 shows a ray that has been cast toward the object that is approximated by collection 400. The ray extends into and out of the plane of the page upon which FIG. 7 appears. FIG. 8 shows a plane containing the ray that is perpendicular to the page upon which FIGS. 7 and 8 appear. FIG. 9 shows a sub-set of shapes (shaded for clarity) that might be intersected by the ray. Here, an evaluation has been performed to determine whether the triangle(s) that are defined by the individual vertices straddle the defined plane. If they do straddle the defined plane, then it is possible that they are intersected by the ray. Here, the number of triangles that have to be evaluated by an intersection algorithm have been reduced from 60 to 10.

Figure 10:
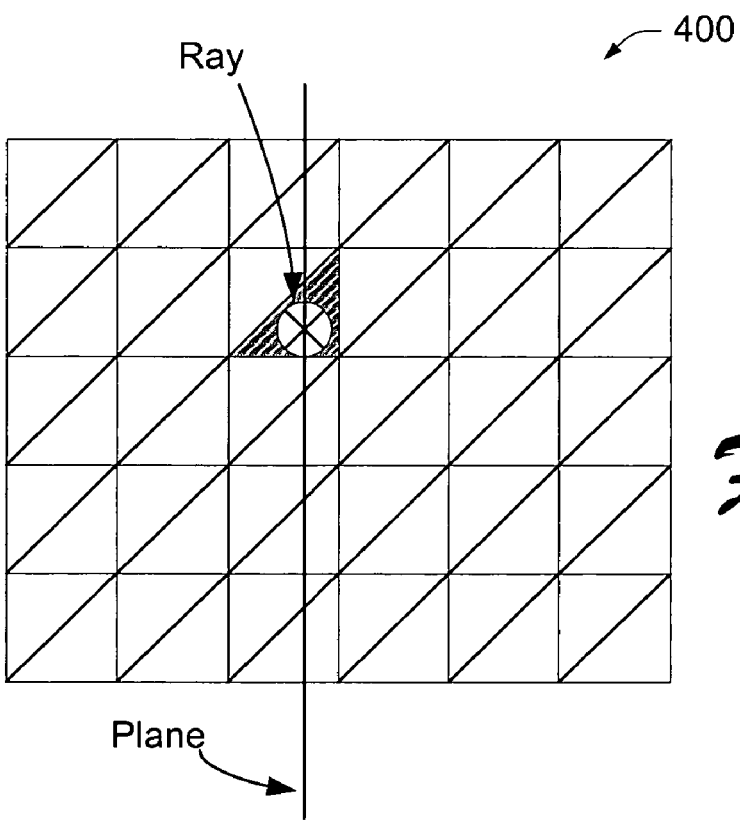
FIG. 10 is a diagram that illustrates the polygon topology of FIG. 9 undergoing processing in accordance with the described embodiment.

FIG. 10 shows collection 400 after the intersection algorithm has been run on all of the triangles in the shaded sub-set of FIG. 9. In this example, only one triangle (shaded for clarity) is intersected by the ray.

Multiple Plane Embodiment

In another embodiment, multiple planes are used to further reduce the sub-set of shapes that need to be evaluated by an intersection algorithm.

Figure 11:
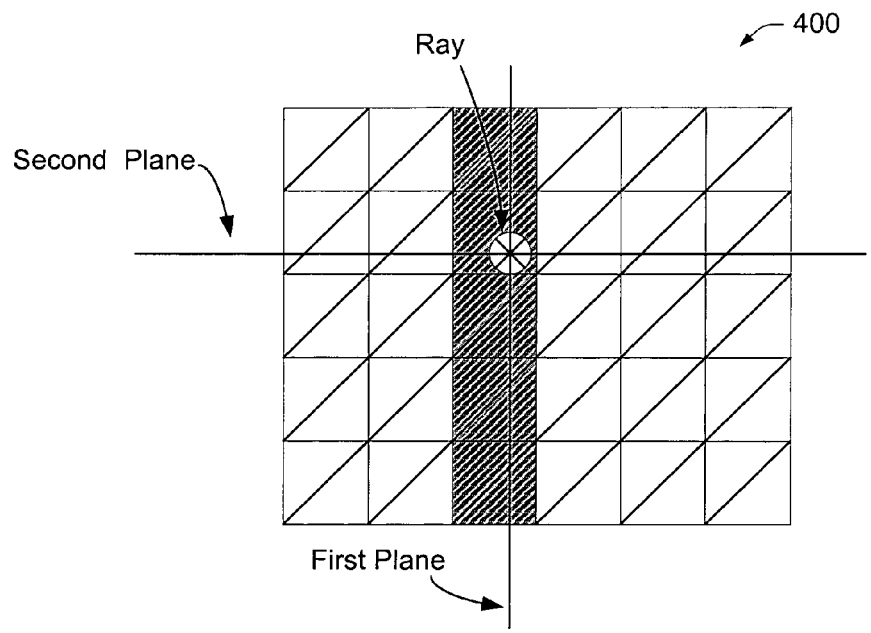
FIG. 11 is a diagram that illustrates the polygon topology of FIG. 4 undergoing processing in accordance with a described embodiment that is different from the embodiment of FIGS. 7–10.
Figure 12:
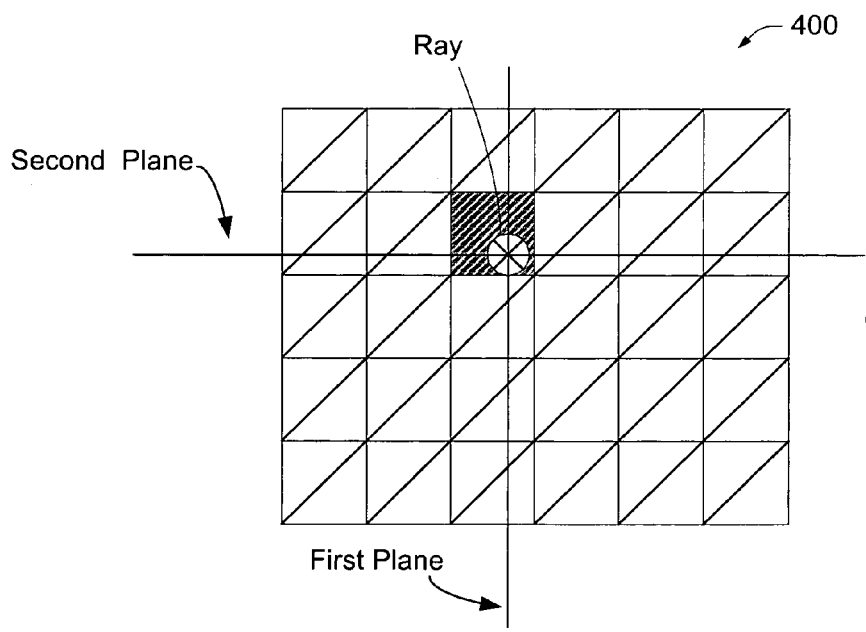
FIG. 12 is a diagram that illustrates the polygon topology of FIG. 11 undergoing processing in accordance with the described embodiment.

FIG. 11 shows collection 400 at a processing point that is the same shown in FIG. 9. FIG. 11, however, illustrates a second plane defined to contain the ray and perpendicular to the first plane. It should be understood that the second plane does not have to be perpendicular to the first plane, but may in fact intersect the first plane in any direction orthogonal to the first plane. At this point, the shapes have been evaluated to determine whether they straddle the first plane. This has produced the illustrated shaded sub-set. FIG. 12 shows an exemplary subset after the shapes of the FIG. 11 sub-set have been evaluated to determine whether they straddle the second plane. In this case, the triangles that need to be evaluated by the intersection algorithm have been reduced from 60 to two. Of course, as should be apparent to one of ordinary skill in the art, more than two reference objects may be used for purposes of further paring down the number of shapes that need to be evaluated.

The inventive methods and apparatus greatly facilitate computer graphics processing by reducing processing complexities associated with ray-intersection. Advancements are achieved by reducing the number of shapes in a collection that must be evaluated for ray intersection. The described embodiment achieves its processing advances by recognizing that aspects of the shapes can be pre-processed prior to subjecting them to intersection processing. The selected aspects in the described embodiment are the vertices of the polygons that comprise the collection. By pre-characterizing the vertices of the polygons, certain polygons are ruled out before they are processed by an intersection algorithm.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. In a computer graphic processing system in which a ray is cast toward an object represented by a collection of pre-determined shapes each characterized by characteristic data, a method for determining which of the shapes are intersected by the ray, the method comprising:
   defining a reference object relative to the represented object;
   determining the positions of the shapes relative to the reference object using the characteristic data; and
   determining, on the basis of the positions of the shapes relative to the reference object, those shapes that have no chance of intersecting the ray, and those remaining shapes that may intersect the ray.

2. The method of claim 1 further comprising using a predetermined algorithm to determine which one of those remaining shapes intersects the ray.

3. The method of claim 1, wherein the collection of shapes comprises at least one polygonal shape.

4. The method of claim 1, wherein the collection of shapes comprises a plurality of polygonal shapes.

5. The method of claim 1, wherein the collection of shapes comprises at least one triangle.

6. The method of claim 1, wherein the collection of shapes comprises a plurality of triangles.

7. The method of claim 1, wherein the collection of shapes comprises a triangle mesh.

8. The method of claim 1, wherein the collection of shapes comprises a triangle strip.

9. The method of claim 1, wherein the collection of shapes comprises a triangle fan.

10. The method of claim 1, wherein said reference object comprises at least one plane.

11. The method of claim 1, wherein said reference object comprises a plurality of planes each of which contain the ray.

12. The method of claim 1, wherein said determining the positions of the shapes comprises determining positional aspects of sub-components of individual ones of the shapes to provide the characteristic data.

13. The method of claim 12, wherein the individual shapes comprise polygons and the sub-components comprise vertices that define the polygons, said determining the positions of the shapes comprising computing the positions of the vertices relative to the reference object.

14. The method of claim 13, wherein the reference object comprises a plane.

15. The method of claim 14, wherein the plane is parallel to one of the x, y, and z axes.

16. In a computer graphic processing system in which a ray is cast toward an object represented by a collection of pre-determined shapes, a method for determining which of the shapes are intersected by the ray, the method comprising:
   defining a collection of polygons that approximate an object, individual polygons having a plurality of vertices;
   casting a ray toward the approximated object;
   defining a reference object relative to the collection of polygons and that contains the cast ray;
   pre-characterizing at least some vertices of at least some of the polygons to provide characteristic data that describes the vertices' positions relative to the reference object; and
   using the characteristic data to ascertain the positions of the individual polygons relative to the reference object.

17. The method of claim 16, wherein the collection of polygons approximate the surface of the object.

18. The method of claim 16, wherein the individual polygons have a similar geometry.

19. The method of claim 16, wherein the individual polygons comprise triangles.

20. The method of claim 16, wherein the collection of polygons has a plurality of faces and a plurality of vertices, said faces outnumbering said vertices.

21. The method of claim 16, wherein at least two of said polygons share at least one side.

22. The method of claim 16, wherein at least two of said polygons share at least one vertex.

23. The method of claim 16, wherein none of said polygons share a vertex.

24. In a computer graphic processing system in which a ray is cast toward an object represented by a collection of pre-determined shapes, a method for determining which of the shapes are intersected by the ray, the method comprising:
   defining a collection of polygons that approximate an object, individual polygons having a plurality of vertices;
   casting a ray toward the approximated object;
   defining a reference object relative to the collection of polygons and that contains the cast ray;
   pre-characterizing at least some vertices of at least some of the polygons to provide characteristic data that describes the vertices' positions relative to the reference object; and
   using the characteristic data to ascertain the positions of the individual polygons relative to the reference object, wherein said using of the characteristic data comprises determining whether an individual polygon is in a sub-set of polygons that might be intersected by the ray.

25. In a computer graphic processing system in which a ray is cast toward an object represented by a collection of pre-determined shapes, a method for determining which of the shapes are intersected by the ray, the method comprising:

defining a collection of polygons that approximate an object, individual polygons having a plurality of vertices;

casting a ray toward the approximated object;

defining a reference object relative to the collection of polygons and that contains the cast ray;

pre-characterizing at least some vertices of at least some of the polygons to provide characteristic data that describes the vertices' positions relative to the reference object; and using the characteristic data to ascertain the positions of the individual polygons relative to the reference object, wherein said using of the characteristic data comprises determining whether an individual polygon is in a sub-set of polygons at least some of which straddle the reference object.

26. In a computer graphic processing system in which a ray is cast toward an object represented by a collection of pre-determined shapes, a method for determining which of the shapes are intersected by the ray, the method comprising:

defining a collection of polygons that approximate an object, individual polygons having a plurality of vertices;

casting a ray toward the approximated object;

defining a reference object relative to the collection of polygons and that contains the cast ray;

pre-characterizing at least some vertices of at least some of the polygons to provide characteristic data that describes the vertices' positions relative to the reference object;

using the characteristic data to ascertain the positions of the individual polygons relative to the reference object, wherein said using of the characteristic data comprises determining whether an individual polygon is in a sub-set of polygons at least some of which straddle the reference object; and evaluating the sub-set of polygons to determine which polygons are intersected by the ray.

27. In a computer graphic processing system in which a ray is cast toward an object represented by a collection of pre-determined shapes, a method for determining which of the shapes are intersected by the ray, the method comprising:

defining a plurality of triangles that approximate an object, individual triangles having three vertices;

casting a ray toward the approximated object;

defining at least one plane relative to the approximated object to contain the ray;

pre-characterizing the vertices of the plurality of triangles to provide characteristic data that describes the positions of the vertices relative to said at least one plane; and using the characteristic data to ascertain the positions of the individual triangles relative to said at least one plane.

28. The method of claim 27, wherein said defining of said plurality of triangles comprises defining a triangle mesh.

29. The method of claim 27, wherein said defining of said plurality of triangles comprises defining a triangle fan.

30. The method of claim 27, wherein said defining of said plurality of triangles comprises defining a triangle strip.

31. In a computer graphic processing system in which a ray is cast toward an object represented by a collection of pre-determined shapes, a method for determining which of the shapes are intersected by the ray, the method comprising:

defining a plurality of triangles that approximate an object, individual triangles having three vertices;

casting a ray toward the approximated object;

defining at least one plane relative to the approximated object to contain the ray;

pre-characterizing the vertices of the plurality of triangles to provide characteristic data that describes the positions of the vertices relative to said at least one plane; and using the characteristic data to ascertain the positions of the individual triangles relative to said at least one plane, wherein said using of the characteristic data comprises determining whether a particular individual triangle has a chance of being intersected by the ray.

32. In a computer graphic processing system in which a ray is cast toward an object represented by a collection of pre-determined shapes, a method for determining which of the shapes are intersected by the ray, the method comprising:

defining a plurality of triangles that approximate an object, individual triangles having three vertices;

casting a ray toward the approximated object;

defining at least one plane relative to the approximated object to contain the ray;

pre-characterizing the vertices of the plurality of triangles to provide characteristic data that describes the positions of the vertices relative to said at least one plane; and using the characteristic data to ascertain the positions of the individual triangles relative to said at least one plane, wherein said using of the characteristic data comprises determining whether a particular individual triangle straddles said at least one plane.

33. In a computer graphic processing system in which a ray is cast toward an object represented by a collection of pre-determined shapes, a method for determining which of the shapes are intersected by the ray, the method comprising:

defining a plurality of triangles that approximate an object, individual triangles having three vertices;

casting a ray toward the approximated object;

defining at least one plane relative to the approximated object to contain the ray;

pre-characterizing the vertices of the plurality of triangles to provide characteristic data that describes the positions of the vertices relative to said at least one plane;

using the characteristic data to ascertain the positions of the individual triangles relative to said at least one plane, wherein said using of the characteristic data comprises defining a sub-set of triangles at least some of which straddle the plane; and evaluating the sub-set of triangles to ascertain which triangles are intersected by the ray.

34. The method of claim 27, wherein none of the triangles share any vertices.

35. The method of claim 27, wherein all of the triangles share at least one vertex with another of the triangles.

36. The method of claim 27, wherein said defining of said at least one plane comprises defining a plane to be parallel to one of the x, y, or z axes.

37. In a computer graphic processing system in which a ray is cast toward an object represented by a collection of pre-determined polygons, a method for determining which of the polygons are intersected by the ray, the method comprising:

defining a sub-set of polygons from a collection of polygons that approximate an object by determining which polygons have vertices that satisfy a predefined relationship relative to a reference object; and evaluating the sub-set of polygons to ascertain which of the polygons is intersected by a cast ray.

38. The method of claim 37, wherein the reference object comprises a plane.

39. The method of claim 37, wherein the reference object comprises multiple planes.

40. In a computer graphic processing system in which a ray is cast toward an object represented by a collection of pre-determined polygons, a method for determining which of the polygons are intersected by the ray, the method comprising:
   defining a sub-set of polygons from a collection of polygons that approximate an object by determining which polygons have vertices that satisfy a predefined relationship relative to a reference object, wherein the reference object comprises a plane; and
   evaluating the sub-set of polygons to ascertain which of the polygons is intersected by a cast ray,
   wherein said determining comprises determining which polygons straddle the plane.

41. One or more computer-readable media having computer-readable instructions thereon which, when executed by a computer, implement the method of claim 37.

42. A programmable computer having a memory and a processor, the memory containing software code which causes the processor to execute the method of claim 37.

43. A computer graphic processing system comprising a programmable computer programmed with computer-readable instructions which, when executed by the programmable computer, implement the following method:
   defining a plurality of polygons that approximate an object, individual polygons having a plurality of vertices;
   casting a ray toward the approximated object;
   defining at least one plane relative to the approximated object to contain the ray;
   pre-characterizing the vertices of the plurality of polygons to provide characteristic data that describes the positions of the vertices relative to said at least one plane;
   using the characteristic data to ascertain the positions of the individual polygons relative to said at least one plane;
   determining which of the individual polygons might be intersected by the ray, based upon their ascertained positions, to provide a sub-set of polygons; and
   evaluating the sub-set of polygons to ascertain which of the polygons are intersected by the ray.

44. The computer graphic processing system of claim 43, wherein said defining of the plurality of polygons comprises defining a polygon mesh.

45. The computer graphic processing system of claim 43, wherein said defining of the plurality of polygons comprises defining a polygon fan.

46. The computer graphic processing system of claim 43, wherein said defining of the plurality of polygons comprises defining a polygon strip.

47. The computer graphic processing system of claim 43, wherein said defining of said at least one plane comprises defining said plane to be parallel to one of the x, y, and z axes.

48. One or more computer-readable media having computer-readable instructions thereon which, when executed by a computer graphic processing system, implement the following method:
   defining a plurality of triangles that approximate an object, individual triangles having three vertices;
   casting a ray toward the approximated object;
   defining at least one plane relative to the approximated object to contain the ray;
   pre-characterizing the vertices of the plurality of triangles to provide characteristic data that describes the positions of the vertices relative to said at least one plane;
   using the characteristic data to ascertain the positions of the individual triangles relative to said at least one plane;
   determining which of the individual triangles might be intersected by the ray, based upon their ascertained positions, to provide a sub-set of triangles; and
   evaluating the sub-set of triangles to ascertain which of the triangles are intersected by the ray.

49. The one or more computer-readable media of claim 48, wherein said defining of the plurality of triangles comprises defining one of a triangle mesh, a triangle strip, and a triangle fan.

50. A computer graphic processing system comprising:
   a processor;
   memory; and
   software code stored in the memory that causes the processor to implement a ray-intersection algorithm which:
   casts a ray at a collection of shapes that approximate an object;
   defines a reference object that contains the ray;
   pre-characterizes aspects of individual ones of the shapes of the collection to provide characteristic data; and
   uses the characteristic data to ascertain the position of the shapes of the collection of shapes relative to the reference object.

51. The computer graphic processing system of claim 50, wherein the ray intersection algorithm casts a ray at a collection of polygons, each of which have similar geometries.

52. The computer graphic processing system of claim 50, wherein the ray intersection algorithm casts a ray at a collection of triangles.

53. The computer graphic processing system of claim 52, wherein the collection of triangles defines a triangle mesh.

54. The computer graphic processing system of claim 50, wherein the ray intersection algorithm pre-characterizes aspects of the shapes by computing positions of various sub-components of the shapes relative to the reference object.

55. The computer graphic processing system of claim 54, wherein the reference object comprises at least one plane.

56. The computer graphic processing system of claim 55, wherein the shapes comprise polygons and the sub-components comprise vertices of the polygons.

* * * * *